United States Patent [19]

Kudo et al.

[11] Patent Number: 4,828,087

[45] Date of Patent: May 9, 1989

[54] INERTIA LOCK TYPE SYNCHRONOUS CLUTCH MECHANISM

[75] Inventors: Satoru Kudo, Tokyo; Sadanori Nishimura, Saitama, both of Japan

[73] Assignee: Honda Giken Kogyo Kabushiki Kaisha, Tokyo, Japan

[21] Appl. No.: 89,024

[22] Filed: Aug. 24, 1987

Related U.S. Application Data

[63] Continuation of Ser. No. 745,274, Jun. 14, 1985, abandoned.

[30] Foreign Application Priority Data

Jun. 14, 1984 [JP] Japan ................... 59-120742

[51] Int. Cl.⁴ ............................................. F16D 23/06
[52] U.S. Cl. ..................................... 192/53 F; 74/339
[58] Field of Search ............... 192/53 E, 53 F; 74/339

[56] References Cited

U.S. PATENT DOCUMENTS 2,364,331 12/1944 White ............................... 192/53 F
3,700,083 10/1972 Ashikawa et al. ................ 192/53 F
4,660,707 4/1987 Sadanori et al. ................. 192/53 F

FOREIGN PATENT DOCUMENTS 2458769 7/1975 Fed. Rep. of Germany .... 192/53 F
2390633 1/1979 France .............................. 192/53 F Primary Examiner—Rodney H. Bonck
Assistant Examiner—Richard M. Lorence
Attorney, Agent, or Firm—Lyon & Lyon

[57] ABSTRACT

An inertia lock type synchronous clutch mechanism wherein a shifting sleeve is splined to a clutch hub and has circumferentially spaced cam portions on each axial side for engaging axially convex portions of an elastic ring on each side which convex portions fit within circumferentially spaced notches formed in the rim of the clutch. The convex portions of the elastic ring engage a blocking ring to cause frictional engagement with the selected gear and synchronize the rotation of that gear and the clutch hub for smooth engagement between the shifting sleeve and that gear.

2 Claims, 3 Drawing Sheets

INERTIA LOCK TYPE SYNCHRONOUS CLUTCH MECHANISM

This is a continuation of application Ser. No. 745,274, filed on June 14, 1985, which is now abandoned.

The present invention relates to an inertia lock type synchronous clutch mechanism for use in a vehicular gear transmission or the like.

A mechanism of this general type is known in the prior art, such as disclosed in U.S. Pat. No. 3,700,083 corresponding to Japanese Patent published No. 48-24096, which is illustrated herein by "Prior Art" FIGS. 1 and 2, wherein the inertia lock type synchronous clutch mechanism has elastic ring members e that are engaged with a sleeve c splined to a rim portion b on the outer circumference of a clutch hub a at a plurality of sloped circumferential portions d protruding from the inner circumference of the sleeve c so that blocking rings f are moved axially into frictional engagement with tapered cone portions h of the synchronized gears g through the force applied on the ring members e by the axial shifting action of the sleeve c. In the prior art mechanism, each of the two ring members is generally constructed of a circular, elastic ring which is mounted on the outer circumference of the root portion of a boss portion i of the corresponding one of the blocking rings f. As a result, the mechanism has the following disadvantages:

(i) In order for each of the elastic ring members e to be allowed to warp radially inward at its portions engaged with the respective ones of the cam portions d, it is necessary that the root portion of the boss portion i be made radially smaller than the ring members e except at support lands j of the ring members e, whereby the boss portion i is thinned at its root portion.

(ii) Each of the elastic ring members is bulged and deformed radially outwardly at its portions between the respective engaged portions by being pressed and deformed radially inward at the portions engaged by the respective cam portions d. This makes it necessary for the splines on the inner circumference of the sleeve c to be made shallow so that they do not interfere with those bulged portions.

The present invention has as an object to provide a mechanism which is free from the aforedescribed disadvantages and is characterized in that the elastic ring members are mounted in the inner circumference of the rim portion of a clutch hub such that boss portions of blocking rings are fitted in the inner circumference of the rim portion to have their end faces abutting against the ring members and in that the rim portion is formed at its circumferential portions corresponding to the respective cam portions with notches which extend in the axial direction whereas each of the ring members is formed with convex portions which are adapted to be fitted in the respective notches so that each of the ring members is engaged at the respective convex portions by the respective cam portions.

The present invention will be described in connection with an embodiment shown in FIGS. 3-5 and in comparison with a prior art mechanism shown in FIGS. 1 and 2, wherein the figures are as follows.

Figure 1:
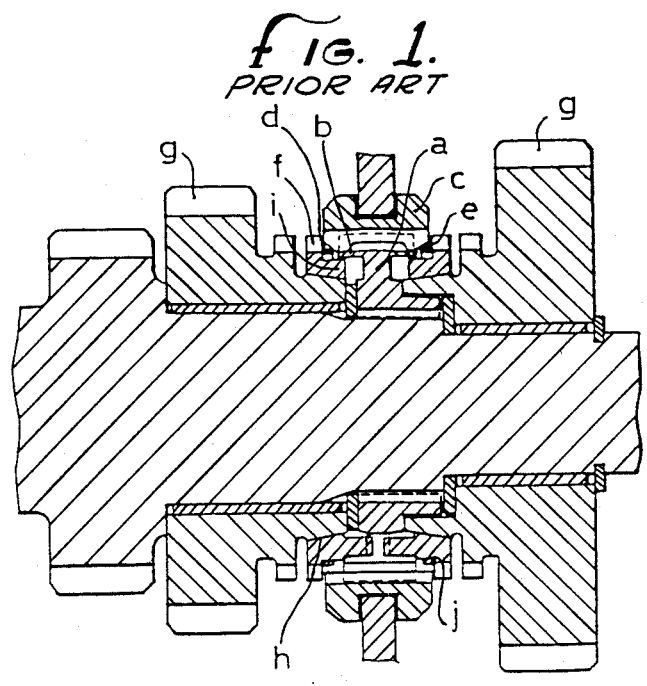
FIG. 1 is a longitudinal sectional view of an example of a prior art mechanism.
Figure 2:
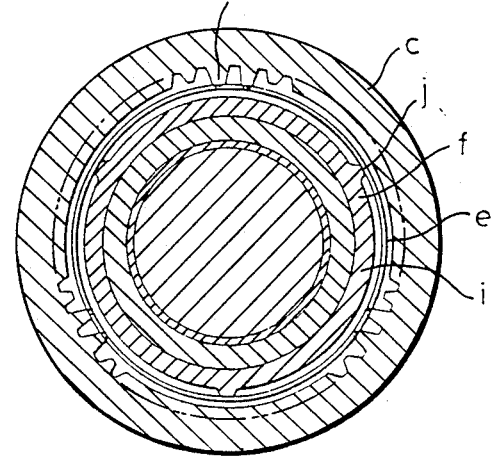
FIG. 2 is a transverse sectional view of the prior art mechanism shown in FIG. 1.
Figure 3:
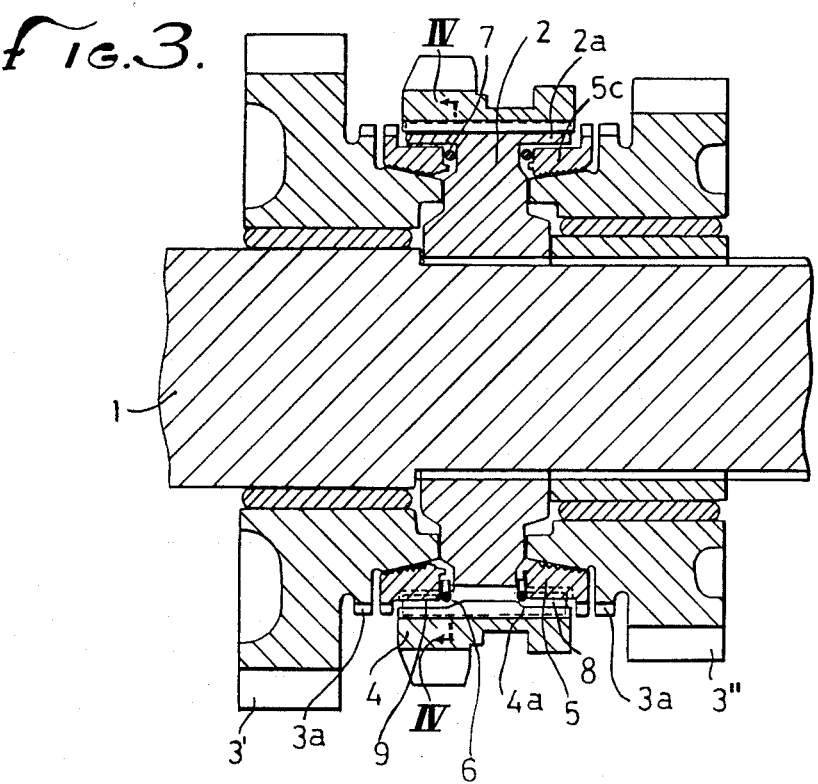
FIG. 3 is a longitudinal sectional view of the synchronous clutch mechanism of this invention.
Figure 4:
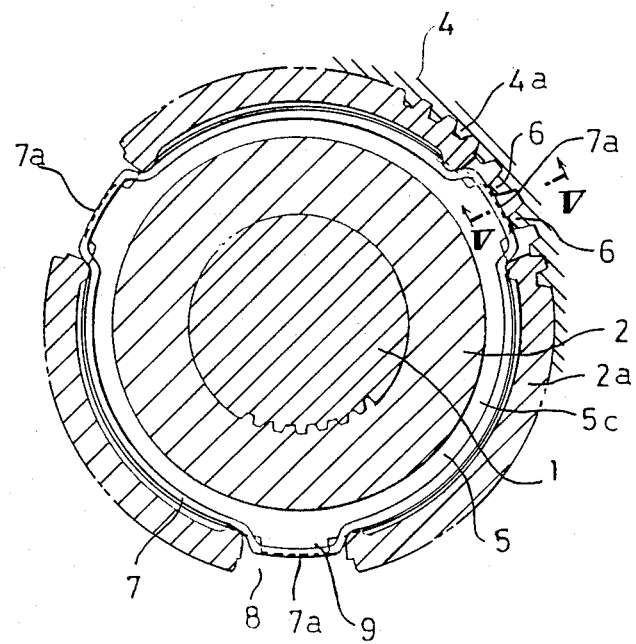
FIG. 4 is a transverse sectional view of the mechanism shown in FIG. 3 taken substantially on the line IV—IV in FIG. 3.

The drawings show the present invention as applied to an inertia lock type synchronous clutch mechanism for 1st - 2nd speed change gears of a vehicular gear transmission but it is to be understood that the invention is equally applicable to other gears and transmissions. An output shaft 1 of the transmission has 1st and 2nd speed synchronous gears 3' and 3" rotatably mounted thereon on opposite axial sides of an intermediate clutch hub 2 which is fixed on the shaft 1. A sleeve 4 is splined to a rim portion 2a on the outer circumference of the clutch hub 2 in a manner whereby the inner circumferential splines 4a of the sleeve 4 and the external splines 3a of each of the gears 3' and 3" mesh with each other upon the axial shifting action of the sleeve 4 from the neutral position shown to one or other axial side by means of a shift fork (not shown) to effect selective connection between each of the gears 3' and 3" and the shaft 1. In order for the rotation of each of the gears 3' and 3" to be synchronized with the sleeve 4 upon that meshing engagement, there is a blocking ring 5 mounted on a tapered cone portion 3b of each of the gears 3' and 3" adjacent the hub 2, which blocking rings 5 each has a spline 5a on its outer circumference. Each of the rings 5 is engaged with the hub 2 in a manner whereby it can rotate relative to the hub by at least one half pitch of the splines for meshing, as will be described hereinafter. Moreover, the sleeve 4 is formed with a plurality, e.g. three radially sloped cam portions 6 comprised of a pair of cams protruding from each axial end of the sleeve 4 and such that the three cam portions 6 are angularly spaced by 120 degrees. Mounted between the sleeve 4 and each of the blocking rings 5 is an elastic ring member 7 adapted to engage with the cam portions 6 of each pair. With this construction, as the sleeve 4 is shifted from its neutral position to one axial side, e.g., toward the 1st speed synchronized gear 3', the blocking ring 5 on that side is first moved axially by the elastic ring member 7 on that same side into frictional engagement with the tapered cone portion 3b of the gear 3' at the threaded tapered hole 5b formed in the inner circumference of the blocking ring 5. This causes the ring 5 to be rotated relative to the clutch hub 2 so that it is indexed into the state in which the chamfers at the end portions of the splines 4a of the sleeve 4 and the chamfers of the splines 5a of the ring 5 face each other. Upon further axial movement of the sleeve 4 from that state causes the elastic ring member 7 to be pressed radially inward at the respective cam portions 6, and the two chamfers abut against each other to stop the relative rotational movement of said sleeve 4 and to force the ring 5 into frictional engagement with the tapered cone portion 3b so that synchronization between the sleeve 4 and the gear 3' is effected through the ring 5. After completion of this synchronization, the frictional torque transmitted through the ring 5 and cone portion 3b disappears to release the blocking force of said sleeve 4 whereupon the sleeve 4 is allowed to move axially so that its splines 4a slide through splines 5a of the ring 5 into engagement with the splines 3a of the gear 3'.

The construction of the clutch mechanism as thus far described is not especially different from that of the aforementioned prior art. In the embodiment shown of the present invention, however, each of the elastic ring members 7 is fitted in the inner circumference of the rim portion 2a of the clutch hub 2 such that each of the blocking rings 5 has its boss portion 5c fitted in the inner circumference of the rim portion 2a to have its end face abutting against the ring member 7. Moreover, the rim portion 2a is formed at three circumferentially spaced portions corresponding to the respective cam portions 6 with three notches 8 which extend in the axial direction and each ring member 7 is formed with three circumferentially spaced convex portions 7a which are engaged with the three respective cam portions 6. In the shown construction, each of the rings 5 is formed on the outer circumference of its boss portion 5c with engagement lands 9 which are adapted to engage with the respective notches 8 with some circumferential play being left, so that each of the rings 5 is engaged with the hub 2 in a manner to rotate relative thereto by at least one half pitch of the splines, as has been described hereinbefore. The respective convex portions 7a normally are formed by partially bending each of the elastic ring members 7 radially outward at the three locations. Those convex portions 7a may be formed of integrally protruding tongues on the elastic ring members 7 at an inclination with respect to the axial direction. In this latter case, the convex lands 7a are axially offset with respect to the body of each of the elastic ring members 7 so that the cam portions 6 are formed nearer the chamfers of the splines 4a of the sleeve 4 in accordance with that offset. However, there is the risk that the cam portions 6 will become burred as the chamfers are worn in use which in turn can cause wear on the convex portions 7a by those burrs unless great care is taken in the design shape and dimensions.

Figure 5:
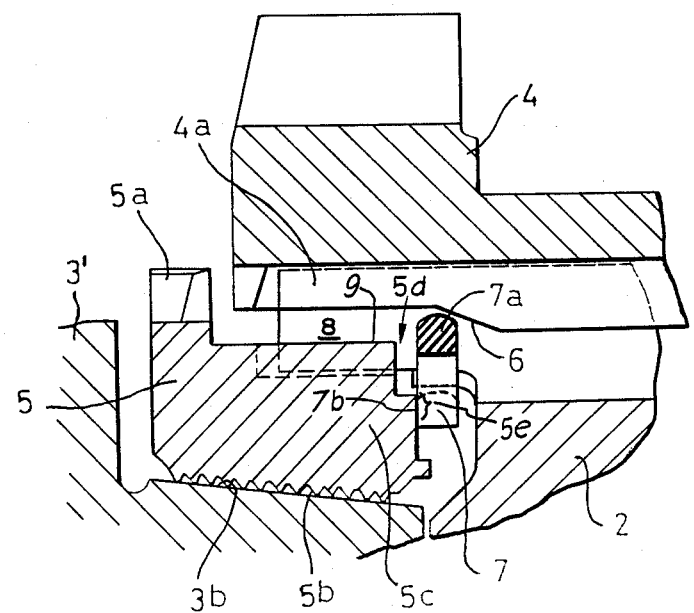
FIG. 5 is an enlarged longitudinal sectional view taken substantially on the line V—V in FIG. 4 and illustrating the mechanism in a neutral position.

The operation of the illustrated construction will be described in the following. By the shifting action of the sleeve 4 in the axial direction, first the cam portions 6 formed on the inner circumference of the sleeve 4 are brought into abutment against the corresponding convex portions 7a so that the convex portions 7a bend in the axial direction into the space provided by the end notch 5d, rather than engage the blocking ring 5. Thus, the frictional force is primarily exerted between the flat radial surface 7b of ring member 7 and the flat radial surface 5e of the blocking ring 5, as shown in FIG. 5.

According to the present invention, the ring member 7 is supported stably in the inner circumference of the rim portion 2a of the clutch hub 2 so that it is engaged uniformly at its convex portions 7a with the respective cam portions 6 and moved in the axial direction when the sleeve 4 is shifted. Since each of the rings 5 is caused to have its end abutting against the end of the corresponding one of the ring members 7 in a face-to-face relationship, moreover, it is reliably centered with respect to and frictionally engaged with the corresponding tapered cone portion without the possibility of being loaded in an offset manner in the radial direction, whereby here the indexing action and the balking action are properly accomplished to effect synchronization as has been described hereinbefore.

Thus, according to the present invention, the elastic ring members are mounted in the inner circumference of the rim portion of the clutch hub, and the blocking rings are caused to abut against the end faces of the boss portion of the clutch hub. As a result, the centering action of each of said rings at the beginning of the shifting action of the sleeve is ensured to effect the reliable synchronization even if the shifting action is abrupt. Even with the radial warp of one of the ring members, no interference is caused between the elastic ring member and the boss portion of the corresponding blocking ring and the splines of said sleeve. This makes it possible to increase the size of both the external diameter of the boss portion and the depth of the splines without being adversely effected by that warp. This results in overcoming the disadvantages concomitant with the aforementioned example of the prior art.

The invention claimed;

1. An inertia lock type synchronous clutch mechanism in which an elastic ring member is engaged by a sleeve splined to a rim portion on an outer circumference of a clutch hub at a plurality of sloped circumferential cam portions protruding from an inner circumference of said sleeve for the ring member to engage and axially move a blocking ring into frictional engagement with a tapered cone portion of a synchronized gear by an axial shifting action of said sleeve, the improvement comprising, said ring member being mounted in an inner circumference of said rim portion of the clutch hub, said blocking ring having a boss portion fitted in the inner circumference of said rim portion, said boss portion having an end face abutting against said ring member, said rim portion being formed at circumferential portions corresponding to respective said cam portions with notches which extend in an axial direction, said ring member being formed with convex portions which fit in the respective ones of said notches so that each of the convex portions of said ring member is engaged and centered at the respective said convex portions by the respective said cam portions, the blocking ring having an end notch at least at each said convex portion for allowing axial flexing of said convex portions by said cam portions during shifting without said convex portions engaging said blocking ring, and the ring member and blocking ring having flat radial surfaces for sliding interengagement circumferentially between said convex portions of the ring member.

2. The clutch mechanism of claim 1 wherein an outer circumference of said boss portion is formed with engagement lands which extend into the notches of the rim portion of the clutch hub and the notches and the engagement lands extending into the notches have relative circumferential lengths for allowing a small amount of relative circumferential movement between the clutch hub and the blocked rings.

* * * * *